Oct. 21, 1930.   A. M. NIVEN   1,778,909
SLEEVE VALVE OPERATING MECHANISM
Filed Jan. 25, 1926   2 Sheets-Sheet 1
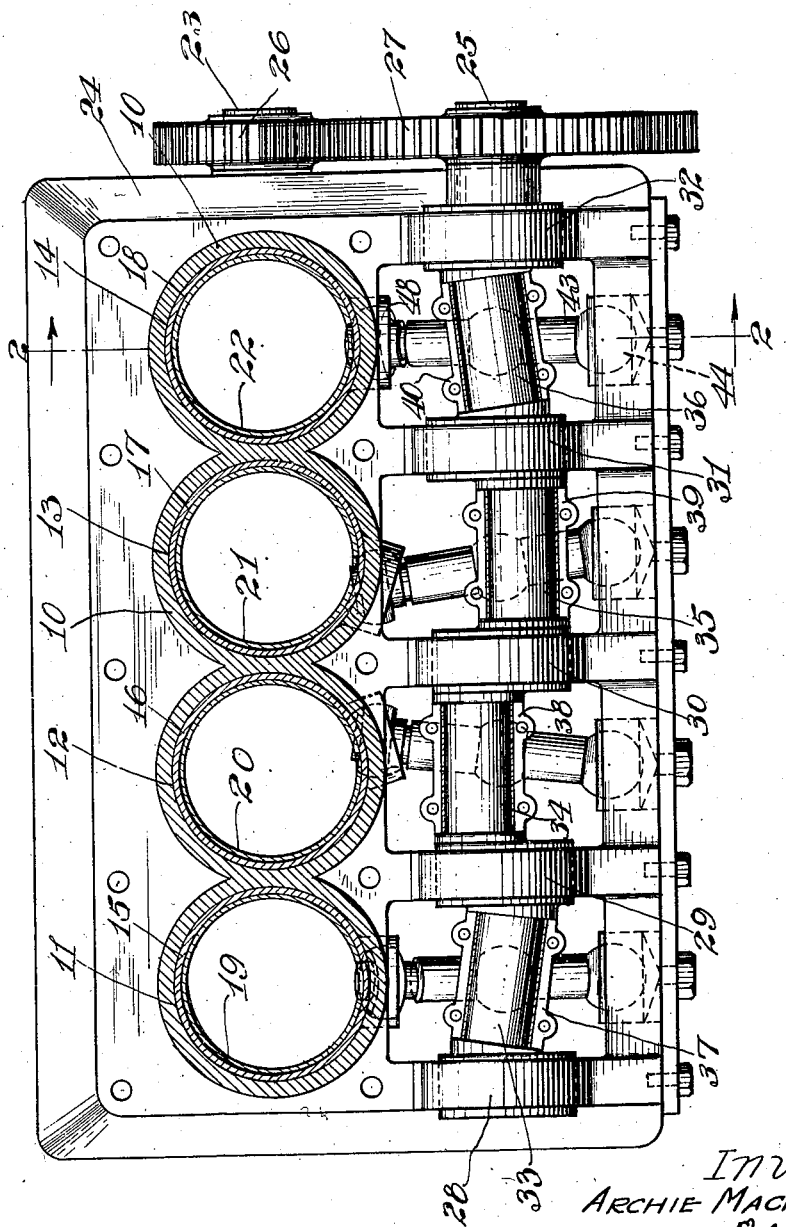
Inventor
ARCHIE MACPHAIL NIVEN.
BY Albert C. Bell
Attorney.

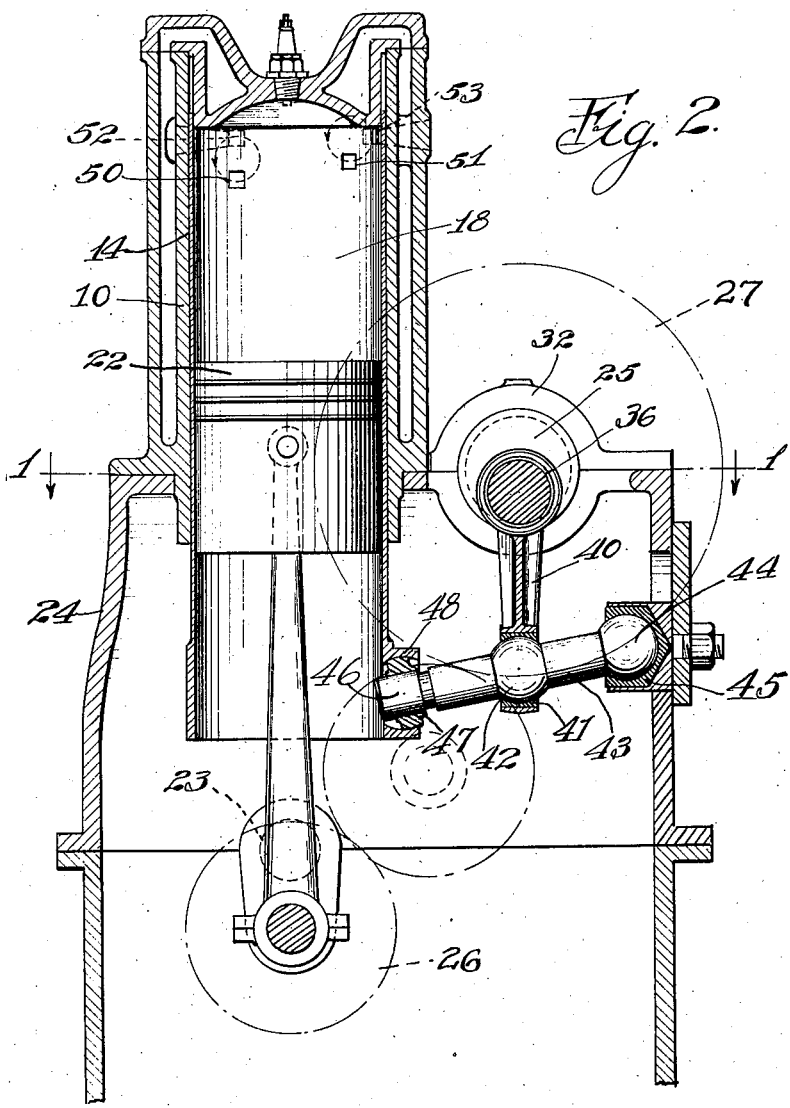

Patented Oct. 21, 1930

1,778,909

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE-VALVE-OPERATING MECHANISM

Application filed January 25, 1926. Serial No. 83,512.

My invention relates to an improved form of operating mechanism for sleeve valves of internal combustion engines, of the type where a sleeve having both reciprocatory and rotary motion is employed in connection with each piston of a motor of the reciprocatory type, for the purpose of controlling the opening and closing of inlet and exhaust ports to the power chamber communicating with the piston.

My operating mechanism is particularly applicable where the motion imparted to the valve sleeve is such that any point on the sleeve travels in a path that is a closed curve, in which case the rotary and reciprocatory motions of the sleeve are combined to produce such resultant motion. My present invention is not concerned with any particular construction of motor excepting that its inlet and exhaust ports shall be controlled by sleeves of the kind described, which sleeves may be located relatively to the power chambers of the motor and cooperate with the ports thereof in any manner best suited to the construction and performance of the motor in any particular case. I am aware that mechanisms of different kinds have been proposed heretofore for operating sleeves of the kind under consideration, and that in many cases to secure compact and effective drive mechanisms, gears have been employed to transmit and change the direction of the necessary motions and driving efforts required, particularly where it is sought to house the sleeve operating mechanism in small space. While these earlier constructions have been found to operate with some degree of success, it is none the less true that the gearing employed frequently introduces undesirable complication both from the structural and operating standpoints. It is an object of my present invention to produce an operating mechanism that will effectively communicate both longitudinal and rotary motion to the sleeves of the motor without the use of toothed gears of any kind, the construction being such that the mechanism is compact and positive in action and that ample opportunity is afforded at all points for adequate bearing surfaces to prevent undue bearing pressures and consequent wear and loose connections. These results are secured by driving all of the sleeves of a multicylinder motor from a common shaft operated from the main crank shaft of the motor, the sleeve operating shaft being provided with a wobble crank for each sleeve connected by a connecting rod and lever with the corresponding sleeve to impart motion in two directions to it.

My invention will best be understood by reference to the accompanying drawings showing a preferred embodiment thereof in which Fig. 1 shows a multicylinder motor in plan view equipped with my sleeve operating mechanism, the cylinder portion of the motor being illustrated diagrammatically, this view being taken along the line 1—1 in Fig. 2, and Fig. 2 is a sectional view of the parts shown in Fig. 1 taken along the line 2—2.

Similar numerals refer to similar parts throughout the several views.

As shown in Fig. 1, a cylinder block is illustrated diagrammatically at 10, which has a plurality of bores 11, 12, 13 and 14 therein in parallel arrangement to receive the valve sleeves 15, 16, 17 and 18 respectively, the bores of the sleeves receiving in turn the pistons 19, 20, 21 and 22 respectively of the motor. These pistons are connected in the usual manner with a crank shaft 23 for delivering from the motor the power produced thereby.

The cylinder block 10 is supported by a crank case 24, which besides supporting the crank shaft 23 also supports a sleeve operating shaft 25 with its axis parallel with the axis of the crank shaft 23. The shafts 23 and 25 are connected by gears or equivalent driving devices, 26 and 27 in the ratio of one to two, to drive the shaft 25 at half the speed of the shaft 23, where the operation is four-cycle.

The crank case 24 is provided with bearings 28, 29, 30, 31 and 32 for the shaft 25, and between these bearings and substantially opposite the mid portions laterally of the sleeves, the shaft 25 is provided with wobble cranks 33, 34, 35 and 36 respectively, these wobble cranks in turn carrying the upper ends of connecting rods 37, 38, 39 and 40 respectively. One feature of my invention resides in the provision of a wobble crank layshaft which may be assembled longitudinally through the crankcase bearings 28, 29, 30 and 32. The wobble cranks in their axial projection are within the diameter dimension of the crankcase bearings. The axis of the wobble crank bearings preferably lie substantially in the plane of the parting surface or connection between the crankcase and cylinders as shown in Fig. 2.

The construction of each of the wobble cranks, and the operating connections extending from it to the corresponding valve sleeve are the same in each case, the only difference being that they are angularly displaced from each other on the operating shaft 25 to properly time the operation of the valve sleeves 15, 16, 17 and 18 relatively to each other, depending upon the firing order desired. As a result it will be necessary to describe but one of these operating mechanisms for example that employed with the valve sleeve 18, which is more clearly shown in vertical sectional view in Fig. 2. As shown in this figure, the lower end of the connecting rod 40 carries a spherical bearing socket 41 which is a turning fit on a spherical portion 42 of a lever 43, the end of which is of spherical shape as shown at 44 and engaged with a turning fit by a socket support 45. The spherical portion 42 may be slidable on lever 43 or may be fixed thereto. With the parts proportioned as shown the portion 42 may be fixed to the lever. The spherical ball portion 42 may be located at any position between the extremities of lever 43 depending on the leverage desired. The construction described permits free relative turning movement in any direction between the connecting rod 40 and the lever 43 and between the lever 43 and its supporting socket 45. The other end of the lever 43 is of reduced diameter as indicated at 46 and a sliding fit in a spherical bearing member 47 having its outer surface a turning fit in a spherical socket 48 carried by and extending from the lower end of the sleeve 18.

It will be noted that the crank 36 is a cylindrical member from the ends of which, as indicated in Fig. 1, shoulders on the shaft 25 extend outwardly and practically at right angles to the surface of the crank, and that the upper end of the connecting rod 40 closely fits between said shoulders around the cylindrical crank; also that in its lowermost position, indicated in Fig. 1 the crank is inclined somewhat to a vertical plane passing through the axis of the operating shaft 25. The effect of this relation, for either the lowermost or uppermost position of the connecting rod 40, is therefore to turn the connecting rod somewhat on its vertical axis, which is freely permitted by the connection between the lower end of the connecting rod and the lever 43. In passing from its lowermost position to its uppermost position, however, for any intermediate position of the crank 36 its axis is inclined to a greater or less degree to a horizontal plane passing through the axis of the operating shaft 25 and this inclination serves to rock the lower end of the connecting rod 40 longitudinally of the shaft 25, carrying the mid portion of the lever 43 with it, this rocking motion taking place about the mid point of the crank 36 as a center. The crank 36 thus imparts motion in two directions to the lever 43, first the motion longitudinally of the shaft 25 just described and second a motion laterally of the shaft 25 due to the eccentricity of the crank 36 relatively to the shaft 25.

As a result of the operating connections above described between the crank 36 and the sleeve 18, a complete cycle of operation of the sleeve may be traced as follows: With the crank 36 in its lowermost position, the connecting rod 40 is in the mid position of its rocking movement and the sleeve 18 is therefore in its mid position angularly and at the lowermost point of its travel longitudinally; when the shaft 25 has rotated a quarter of a turn, the sleeve 18 has been raised to the mid position of its longitudinal movement and at the same time the wobble action of the crank 36 has rocked the lower end of the connecting rod 40 to one of its extreme positions longitudinally of the shaft 25, thus rotating the sleeve 18 to one extreme of its angular movement; when the assumed rotation of the shaft 25 has completed a half rotation, the rocking movement of the connecting rod 40 has again brought the lower end of the connecting rod to its mid position longitudinally of the shaft 25 and therefore has moved the sleeve 18 to the mid position of its angular movement and the eccentricity of the crank 36 has moved the sleeve 18 to the extreme upper position of its longitudinal movement; continued rotation of the shaft 25 through another quarter rotation, by the wobble action of the crank 36 moves the sleeve 18 angularly to the opposite extreme of its angular movement and at some time brings the sleeve to its mid position longitudinally; and the remaining quarter rotation of the assumed cycle of movement of the operating shaft rotates the sleeve 18 back to its mid position angularly due to the wobble action of the crank 36 and to the lowermost point of its longitudinal travel by the eccentric action of the crank 36, thus bringing the sleeve back to its assumed starting point. The motion described, it will be observed, results in any point on the sleeve tracing a closed curved path relatively to the motor cylinder, which is a condition to be desired to reduce the necessary travel of the sleeve to a minimum and yet provide for a quick opening and closing of the several ports controlled by the sleeve, and further to impart movement to the sleeve of a kind conducive to thorough lubrication of the sleeve surfaces moving in contact with other parts of the motor construction. It will be observed that the amount of longitudinal motion imparted to the sleeve is determined by the amount of eccentricity of the crank 36 and the proportioning of the lever 43, as stated before and that the amount of angular movement of the sleeve 18 is determined by the amount by which the crank 36 departs from parallelism with the axis of the shaft 25, the center to center length of the connecting rod 40, and the proportioning of the lever 43.

It will be observed that the operating shaft 25 may if desired be constructed from a single piece of metal, or if preferred it may be built up, but in any event when completed it constitutes a single structure having no parts movable relatively to each other. It will also be observed that all of the bearing surfaces of the operating mechanism may be made relatively large to the end that the unit bearing pressures may be relatively small, thus insuring durability and effective operation. It will also be observed that with a construction of this kind, there is every opportunity for making all of the parts as substantial and strong as desired, thus further insuring stability and efficient operation. Again all of the operating mechanism for the sleeves is closely associated, forms a compact unit and occupies small space as a whole in the motor structure.

In Fig. 2 I have illustrated the sleeve 18 as provided with inlet and exhaust ports 50 and 51 respectively for communication with corresponding ports 52 and 53 in the cylinder block 14 for connection in the usual manner with the manifolds not shown, of the motor, it being understood that these ports are merely illustrative and diagrammatic to indicate the nature of operation of the sleeve 18, also that the other sleeves are similarly provided with inlet and exhaust ports in any manner dictated by the construction and design of the particular motor with which my sleeve operating mechanism is employed.

By the term "mid-portion" as used in the specification and claims applying to the location of the spherical portion 42, I mean that portion of lever 43 amid its extremities, i. e., that portion between the fulcrum 44 and the end 46.

While I have shown my invention in the particular embodiment above described, it will be understood that I do not limit myself to this exact construction as I may employ equivalents known to the art at the time of the filing of this application without departing from the scope of the appended claims.

What I claim is:

1. A sleeve valve internal combustion engine comprising a crankcase carrying a plurality of cylinders each of which is provided with a piston and a sleeve valve operable between the piston and cylinder, a crankshaft, rods connecting the crankshaft and pistons, said crankcase being provided with a plurality of spaced bearings positioned above the longitudinal axis of the crank shaft, a wobble crank layshaft provided with alternating bearings and wobble cranks, said crankcase bearings receiving the layshaft bearings, means connecting the wobble crank and sleeve valves for imparting combined reciprocating and oscillating movement to the sleeve valves, said crankcase bearings being of sufficient interior diameter to permit passage axially therethrough of the wobble crank layshaft, the wobble cranks in their axial projection lying within said crankcase bearings.

2. A sleeve valve internal combustion engine comprising a crankcase carrying a plurality of cylinders each of which is provided with a piston and a sleeve valve operable between the piston and cylinder, a crankshaft, rods connecting the crankshaft and pistons, said crankcase being provided with a plurality of spaced bearings positioned above the longitudinal axis of the crank shaft, a wobble crank layshaft provided with alternating bearings and wobble cranks, said crankcase bearings receiving the layshaft bearings, means connecting the wobble cranks and sleeve valves for imparting combined reciprocating and oscillating movement to the sleeve valves, said crankcase bearings being of sufficient interior diameter to permit passage axially therethrough of the wobble crank layshaft, the wobble cranks in their axial projection lying within said crankcase bearings, the axis of the wobble layshaft bearings and crankcase bearings lying substantially in the plane of the connection between the cylinders and the crankcase, said plane positioned above the connections between the wobble cranks and sleeve valves.

3. A sleeve valve internal combustion engine comprising a crankcase carrying a plurality of cylinders, each of which is provided with a piston and a sleeve valve operable between the piston and cylinder, a crank shaft, rods connecting the crank shaft and pistons, said crankcase being provided with a plurality of spaced bearings, the intermediate spaced bearings located in planes transversely positioned with respect to the longitudinal axis of the engine and extending in a plane intermediate of said cylinders, a wobble crank layshaft provided with alternating bearings and wobble cranks, said spaced crankcase bearings receiving the layshaft bearings, means connecting the wobble crank and sleeve valves for imparting a combined reciprocating and oscillating movement to the sleeve valves, said crankcase bearings having an interior diameter sufficient to permit the passage axially therethrough of the wobble crank layshaft, the wobble cranks in their axial projection lying within all of said crankcase bearings.

In witness whereof, I hereunto subscribe my name this 22nd day of January, A. D. 1926.

ARCHIE MACPHAIL NIVEN.